United States Patent Office 3,814,750
Patented June 4, 1974

3,814,750
BASIC ETHERS OF 1-PHENYL-2-(2-THIENYL) ETHANOLS
Peter Edward Cross, Canterbury, and Roger Peter Dickinson, Worth, near Deal, England, assignors to Pfizer Inc., New York, N.Y.
No Drawing. Filed June 23, 1972, Ser. No. 265,631
Claims priority, application Great Britain, July 14, 1971, 32,956/71
Int. Cl. C07d 63/12
U.S. Cl. 260—239 B
4 Claims

ABSTRACT OF THE DISCLOSURE

Benzyl- and thenyl analogs of diphenhydramine and acid addition salts thereof useful as gastric anti-secretory agents, and methods for their preparation are described.

BACKGROUND OF THE INVENTION

Field of the invention

The invention relates to compounds having anti-histamine activity, and is particularly concerned with a class of novel α-(alkyl-substituted benzyl or thenyl)-benzyloxy derivatives of amines which have the property of blocking the actions of histamine at the so-called "$H_2$" receptor sites, e.g., those which influence gastric acid secretion, but have little or no ability to block the actions of histamine at the so-called "$H_1$" receptor sites, e.g., those which influence bronchial constriction.

SUMMARY OF THE INVENTION

The novel compounds of the invention have the general formula

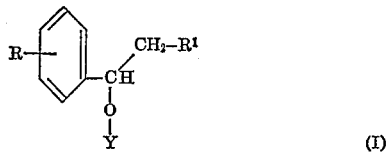

(I)

wherein

R is selected from the group consisting of hydrogen, a 3-position halogen atom and a 4-position halogen atom;
$R^1$ is selected from the group consisting of

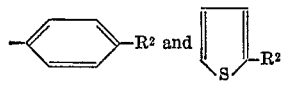

wherein $R^2$ is alkyl containing from 3 to 5 carbon atoms; and
Y is selected from the group consisting of: (a) aminoalkyl group of the formula —Alk—$NR^3R^4$ in which $R^3$ and $R^4$ each represent a lower alkyl group; and $R^3$ and $R^4$ when taken together with the nitrogen atom to which they are attached form a saturated heterocyclic group containing from 5 to 7 atoms in the heterocyclic ring and which may contain a second heterocyclic atom selected from the group consisting of —O—, —S—, —NH—, —N(lower alkyl)— and —N(benzyl)—; and "Alk" represents a divalent saturated aliphatic hydrocarbon group containing from 2 to 4 carbon atoms, the free valences being located on different carbon atoms; and (b) an amino-cyclic group of the formula

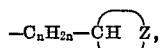

in which n is 0, or an integer from 1 to 3, and Z is a divalent group which completes a saturated heterocyclic ring containing at least one nitrogen atom and at least 4 carbon atoms, any such nitrogen atom being separated from the oxygen atom to which the amino-cyclic group is attached by a chain of from 2 to 4 carbon atoms;

and include the pharmaceutically-acceptable acid addition salts of such compounds.

In the formula, when R represents a halogen atom, halogen comprises fluorine, chlorine, bromine and iodine.

$R^2$ may be a straight or a branched chain alkyl group. For example, it may be a n-propyl, iso-propyl, n-butyl, iso-butyl, sec-butyl, or tert-butyl group or an amyl group. Preferably, it is a tert-butyl group or a neopentyl group.

When Y is a —Alk—$NR^3R^4$ group, $R^3$ and $R^4$ may each be, for example, a methyl, ethyl, propyl or butyl group, or together with the nitrogen atom may form, for example, a pyrrolidino, piperidino, morpholino, thiomorpholino, piperazino, perhydroazepino or perhydrodiazepino group. When $R^3$ and $R^4$ form with the nitrogen atom a saturated heterocyclic group which contains a further nitrogen atom, then such further nitrogen preferably carries a lower alkyl or a benzyl group as substituent.

When Y is a —Alk—$NR^3R^4$ group, —Alk— may be, for example, an ethylene, propylene, ethyl-substituted ethylene, dimethyl-substituted ethylene, trimethylene or tetramethylene group.

When Y is a

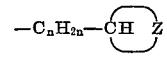

group, —$C_nH_{2n}$— may be, for example, a methylene, ethylidene, ethylene, propylene or trimethylene group, and the heterocyclic ring completed by Z may be, for example, a pyrrolidine, piperidine, morpholine, thiomorpholine, piperazine, perhydroazepine or perhydrodiazepine ring, provided that any nitrogen atom in the ring is separated by at least 2 carbon atoms from the oxygen atom to which the group is attached.

Thus,

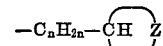

may be, for example, a 3-pyrrolidinyl or 3- or 4-piperidyl group, a 2- or 3-pyrrolidinylmethyl or 2-, 3- or 4-piperidylmethyl group, a 2-(2- or 3-pyrrolidinyl)ethyl or 2-(2- or 3-piperidyl)ethyl group, or a 3-(2-pyrrolidinyl)propyl or 3-(2-piperidyl)propyl group. Any nitrogen atom in Z is preferably substituted with a lower alkyl or a benzyl group while any carbon atom in

may be substituted with a lower alkyl group.

Throughout this specification, "lower alkyl group" is defined as one containing from 1 to 4 carbon atoms.

Pharmaceutically-acceptable acid addition salts of the compounds of the invention can be prepared from acids which form non-toxic addition salts containing pharmaceutically-acceptable anions, such as the hydrochloride, hydrobromide, hydroiodide, sulphate or bisulphate, phosphate or acid phosphate, acetate, maleate, fumarate, oxalate, lactate, tartrate, citrate, gluconate, saccharate, and p-toluene sulphonate salts.

DETAILED DESCRIPTION OF THE INVENTION

The compounds of the invention can be prepared in a number of ways:

(1) The compounds of the formula (I) are prepared from the appropriate alcohol of the formula:

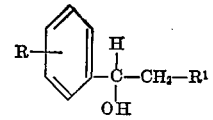

(II)

by reaction with an alkali metal compound in an inert solvent to form the alkali metal derivative of the alcohol and then with the appropriate halide, of the formula:

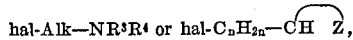

hal-Alk—NR³R⁴ or hal-C_nH_{2n}—CH Z, where "hal" represents a halogen atom, to yield the required product direct.

In this method the inert solvent can, for example, be toluene or dimethylformamide. The formation of the alkali metal derivative is carried out by adding sodium hydride cautiously to the solution of the alcohol and then heating. Reaction with the aminoalkyl halide (e.g., the chloride) is carried out at reflux temperature.

The alcohol of the formula (II) is prepared by reacting a lithium alkyl, e.g., n-butyl lithium, with 4-R²-bromobenzene or 2-R²-thiophene respectively, in a dry inert solvent, e.g., ether, and under an inert atmosphere, e.g., dry nitrogen, to form the lithium derivative of R¹H and reacting the latter in the same solvent, initially at a low temperature, e.g., 0° C., with styrene oxide, the latter being optionally substituted on the phenyl group with a halogen atom. The alcohol is recovered in crude form by adding water cautiously to the reaction mixture (cooled to room temperature) with stirring, separating the organic layer, extracting the aqueous layer with a suitable organic solvent, e.g., diethyl ether, and combining the organic solutions. The combined solution is dried, e.g., over anhydrous magnesium sulphate, filtered, and evaporated *in vacuo* to an oil. Purification of the latter, if desired, is effected by reduced pressure distillation.

The alcohol is then reacted according to the procedure already described. In this method the product can be obtained as a free base by precipitation or by removal of solvent under reduced pressure, and purified by addition of water, extraction into a suitable solvent, drying, filtration and evaporation under reduced pressure. Acid addition salts are obtained in the usual manner by addition of the appropriate acid in a suitable solvent, to the liquid base, or to a solution thereof, and collection of the precipitate. Purification is carried out in the usual manner by recrystallization from a suitable solvent.

(2) The compounds of the invention in which Y represents a group —CR⁵R⁶—CH₂NR³R⁴, wherein R⁵ and R⁶ represent 2 hydrogen atoms, a hydrogen atom and a methyl group, 2 methyl groups or a hydrogen atom and an ethyl group are also prepared from a compound of the formula (II), prepared as described in method (1), by reaction with an alkali metal compound, e.g., sodium hydride, in an inert solvent, e.g., dimethylformamide, to form the alkali metal derivative of the alcohol and then with an α-halo carboxylic acid ester, e.g., ethyl α-bromoacetate, to produce a compound of the formula

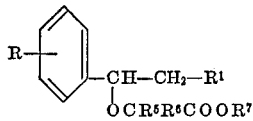

wherein R⁷ is a lower alkyl group, hydrolyzing the ester to the carboxylic acid under basic conditions in an inert solvent, e.g., in ethanolic potassium hydroxide solution, converting the acid to the acid halide, e.g., to the chloride with thionyl chloride, reacting the acid halide with a secondary amine of the formula: HNR³R⁴, and finally reducing the carbonyl group adjacent to the amino group to a methylene group using lithium aluminum hydride in an inert solvent, e.g., diethyl ether.

The final product is recovered by decomposing the excess lithium aluminum hydride with sodium hydroxide solution, filtering off the solid and washing it with diethyl ether, and evaporating the combined reaction solution and washings *in vacuo* to an oil. The latter is then converted to an acid addition salt of the product by conventional means and recrystallized to purity.

All the compounds of the invention contain an asymmetric centre at the carbon atom bearing the (substituted) phenyl group and the 4-alkyl-benzyl or 5-alkyl-2-thenyl group, and thus exist in D- and L-optically active isomeric forms. The invention includes these forms as well as the racemic mixtures. In the above described processes, the products are obtained as the racemic mixtures unless an optically active alcohol starting material of formula (II) is used. Racemic mixtures may be resolved by well-known techniques, e.g., by fractional crystallization of an acid addition salt formed with an optically active acid.

Furthermore, compounds of the invention in which Y represents an asymmetric amino-cyclic group of the formula

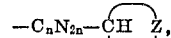

—C_nN_{2n}—CH Z, e.g., compounds in which

—CH Z represents 2- or 3-pyrrolidinyl or 2- or 3-piperidyl, the nitrogen atom therein being optionally substituted with a lower alkyl or a benzyl group, have two asymmetric centres and exist as two racemic pairs of diastereoisomers, unless an optically active halide,

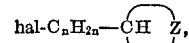

hal-C_nH_{2n}—CH Z, is used as starting material.

Pairs of stereoisomers can usually be separated from each other by physical methods, e.g., by fractional crystallization or chromatography of the free bases or suitable salts. The invention includes the separated pairs, as well as mixtures thereof, as racemic mixtures or as separated D- and L-forms.

The compounds of formula (I) have been found to be potent H₂-antagonists, i.e., blockers of the action of histamine at "H₂" receptor sites. This has been shown in tests in which their inhibiting effect on histamine-induced gastric acid secretion has been measured in experimental animals. In one of such tests, anesthetized rats are sensitized by intravenous injection of carbachol (carbamoyl choline chloride) and are then injected intravenously with a standard dose of histamine and the pH of the gastric contents is measured over a short period until it stabilizes. The test compound is then administered, also intravenously, and the pH of the gastric contents is measured over a further period, until the inhibiting effect of the compound is no longer apparent. A 50% inhibition of the effect of histamine on pH, at a dose of 10 mg./kg. has been found for many of the compounds of the invention, while the most potent have a 100% inhibiting effect at 5 mg./kg. The more potent compounds are also effective over a period of 3 hours or more after injection. In a similar test with anesthetized cats, histamine is continuously infused before and during administration of the test compound.

It has been found that the more active compounds of the invention are those in which R² of either of the groups represented by R¹ in the formula (I) is a *tert*-butyl or a neopentyl group. A particularly preferred compound of the invention is DL-2-(5-neopentyl-2-thienyl)-1-phenyl-2'-di-(n-propyl)-amino diethyl ether.

By virtue of their H₂-blocking activity, the compounds of formula (I) are useful for reducing gastric hyper-acidity and, therefore, in the treatment of peptic ulcers and other conditions caused or exacerbated by gastric hyper-acidity. They are also useful for relieving other conditions due to the actions of histamine of "H₂" receptor sites.

The compounds of the invention can be administered alone, but will generally be administered in admixture with a pharmaceutical carrier or diluent selected with regard to the intended route of administration and standard pharmaceutical practice. For example, they may be administered orally in the form of tablets containing such excipients as starch or lactose, or in capsules either alone or in admixture with excipients, or in the form of elixirs or suspensions containing flavoring or coloring agents. They may be injected parenterally, for example, intramuscularly or subcutaneously. For parenteral administration, they are best used in the form of a sterile aqueous solution which may contain other solutes; for example, enough salts or glucose to make the solution isotonic.

With respect to dosage levels, a broad dosage range of 12.5 to 500 mg. for adults is appropriate, a particularly preferred range being from 30 to 200 mg. Such dosages being administrable up to 4 times a day. The physician in any event will determine the actual dosage which will be most suitable for an individual patient and it will vary with age, the weight and response of the particular patient. The above dosages are exemplary of the average host. There can, of course, be individual cases where higher or lower dosage ranges are merited, and such are within the scope of this invention.

The invention is illustrated by the following examples of the preparation of novel compounds, all temperatures being given in degrees C.

EXAMPLE I (A) A solution of n-butyl lithium (0.2 m.) in n-hexane was slowly added to a cooled solution of 2-neopentyl-thiophene (30.8 g.) in dry diethyl ether (100 ml.) with stirring under an atmosphere of dry nitrogen, and the mixture was stirred for a further 15 minutes. Freshly distilled styrene oxide (24.0 g.) was then added over a period of 10 minutes to the cooled (0° C.) lithium solution and the mixture stirred at room temperature for 1 hour, heated under reflux for a further 2 hours and finally allowed to stand at room temperature overnight. Water was added cautiously with stirring and the organic layer separated. The aqueous layer was washed with diethyl ether and the combined organic extracts were dried over anhydrous magnesium sulphate and evaporated to give an oil, which was distilled under reduced pressure, yielding 29.5 g. of DL-2-(5-neopentyl-2-thienyl)-1-phenyl-ethanol, B.P. 165–8°/1.4 mm.

*Analysis.*—Required for $C_{17}H_{22}OS$ (percent): C, 74.2; H, 7.9. Found (percent): C, 74.4; H, 8.1.

(B) Sodium hydride (50% dispersion in oil, 0.72 g.) was added portionwise to the previous product (4.11 g.) in dry toluene (50 ml.) and the mixture was refluxed for 1 hour. To the stirred solution at reflux temperature was added dropwise 2-di-n-propylamine-ethyl chloride (2.45 g.), and heating was continued for 18 hours before cooling and addition of water. The toluene layer was then separated and the aqueous layer was extracted with diethyl ether, the extracts combined with the toluene solution, and the whole then dried over anhydrous magnesium sulphate and evaporated in vacuo to a pale orange oil. To the latter was added water, followed by dilute hydrochloric acid until a pH of approximately 2.5 has been attained. The aqueous solution was then extracted with diethyl ether, the ethereal extracts discarded, the aqueous layer basified by addition of dilute sodium hydroxide solution, and the aqueous solution re-extracted with fresh diethyl ether. Evaporation of the ethereal solution, previously dried over anhydrous magnesium sulphate, yielded an orange oil which was subsequently distilled under reduced pressure, the distillate then being converted to the oxalate salt (3.7 g.) by conventional means. The product was DL-2-(5-neopentyl-2-thienyl)-1-phenyl-2'-di-(n-propyl)-amino diethyl ether oxalate, M.P. 109–110°.

*Analysis.*—Required for $C_{25}H_{39}NOS \cdot C_2H_2O_4$ (percent): C, 65.95; H, 8.4; N, 2.85. Found (percent): C, 66.0; H, 8.4; N, 2.7.

EXAMPLES II TO V

By methods similar to that of Example I, the compounds shown in the following table were prepared from n-butyl lithium, 2-neopentyl-thiophene, styrene oxide and the appropriate aminoalkyl halide, and characterized as the salt indicated.

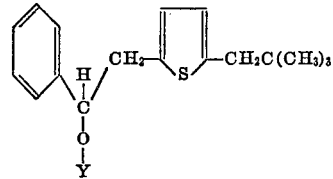

| Example | Y | Salt | M.P., °C. | C | H | N | C | H | N |
|---|---|---|---|---|---|---|---|---|---|
| | | | | | | | [theoretical in brackets] | | |
| II | $-CH_2CH_2N(C_2H_5)_2$ | Citrate | 79–81 | 61.7 | 7.6 | 2.3 | [61.5] | [7.8] | [2.5] |
| III | $-CH_2CH_2N\langle\rangle$ (piperidine) | Oxalate | 95–7 | 63.95 | 8.15 | 2.6 | [64.1] | [7.8] | [2.8] |
| IV | $-CH_2CH_2CH_2N(CH_3)_2$ | Citrate | 75–6 | 60.7 | 7.5 | 2.75 | [61.0] | [7.5] | [2.54] |
| V | $-CH_2CH_2N\langle\rangle$ (pyrrolidine) | Fumarate | 127–9 | 66.05 | 7.1 | 3.9 | [66.5] | [7.65] | [2.9] |

EXAMPLES VI AND VII

By methods similar to that of Example I, the compounds shown in the following table were prepared from n-butyl lithium, 4-neopentyl-bromobenzene, styrene oxide and the appropriate aminoalkyl halide, and characterized as the salt or free base as indicated.

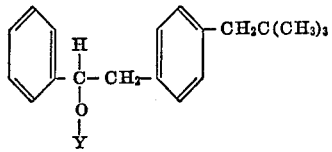

| Example | Y | Salt/free base | M.P./B.P., °C. | C | H | N | C | H | N |
|---|---|---|---|---|---|---|---|---|---|
| | | | | | | | [theoretical in brackets] | | |
| VI | $-CH_2CH_2N(C_2H_5)_2$ | Citrate | 74–5 | 66.3 | 7.9 | 2.2 | [66.5] | [8.1] | [2.5] |
| VII | $-CH_2CH_2N(n-C_3H_7)_2$ | Free base | 200/1 mm. B.P. | 81.7 | 10.1 | 3.1 | [82.0] | [10.45] | [3.5] |

EXAMPLE VIII (A) To a solution of DL-2-(5-neopentyl-2-thienyl)-1-phenyl-ethanol (14.0 g.), prepared as in Example I(A), dissolved in dimethylformamide (35 ml.) was added sodium hydride (50% dispersion in oil, 2.45 g.), and the mixture was warmed to 80°, at which temperature it was kept for 1 hour before cooling to room temperature. Ethyl bromoacetate (8.52 g.) was added dropwise to the mixture, and the latter was then allowed to stand at room temperature overnight before being poured into water. The aqueous solution was extracted with diethyl ether and the ethereal solution separated, dried over anhydrous magnesium sulphate and evaporated *in vacuo* to an oil (12.45 g.).

(B) The crude product of (A) was added to ethanolic potassium hydroxide solution (2.0 g. potassium hydroxide in 120 ml. of ethanol) and the solution was refluxed on a steam bath for 2 hours. Most of the organic solvent was then evaporated off, water was added, and the mixture was acidified by addition of dilute hydrochloric acid. Ether extraction, followed by separation of the ethereal solution, drying of the latter over anhydrous magnesium sulphate and evaporation *in vacuo* yielded the crude product as an oil (6.2 g.).

(C) To a solution of 3.2 g. of the crude product of (B) in benzene (120 ml.) was added thionyl chloride (1.2 g.) dropwise. The mixture was then refluxed on a steam bath for 2 hours and subsequently evaporated *in vacuo* to yield the crude acid chloride product as oil.

(D) The product of (C) was dissolved in benzene, and to the cooled solution at about 10° was added dropwise 1-benzyl-piperazine (3.56 g.). The mixture was stirred and refluxed on a steam bath for 1 hour, and then left to stand at room temperature overnight. A small quantity of white solid had precipitated at this stage, and this was filtered off and the filtrate evaporated *in vacuo* to afford a brown oil, which gradually crystallized to a white solid after several hours standing at room temperature. The solid was recrystallized from 80–100° petrol ether to give DL-1-benzyl-4-[2-(5-neopentyl-2-thienyl)-1-phenyl]-ethoxyacetyl piperazine as white needles (2.8 g.), M.P. 75–7°.

*Analysis.*—Required for $C_{30}H_{38}N_2O_2S$ (percent): C, 73.4; H, 7.8; N, 5.7. Found (percent): C, 73.4; H, 7.9; N, 5.5.

(E) To the previous product (1.65 g.), dissolved in diethyl ether (50 ml.), was added lithium aluminum hydride (0.28 g.), and the mixture was refluxed for 3 hours. 6 drops of 5 N sodium hydroxide solution and 18 drops of water were then added in order to decompose the excess lithium aluminum hydride. The mixture was filtered and the solid filter cake washed with diethyl ether, the combined reaction solution and washings then being combined and evaporated *in vacuo* to afford an oil, from which the dihydrochloride salt was obtained by conventional means and recrystallized from a mixture of ethanol and diethyl ether. Produced was 1.2 g. of DL-2-(5-neopentyl-2-thienyl)-1-phenyl-2'-(4-benzylpiperazin-1-yl) diethyl ether dihydrochloride, M.P. 213–4°.

*Analysis.*—Required for $C_{30}H_{40}N_2OS \cdot 2HCl$ (percent): C, 65.6; H, 7.7; N, 5.1. Found (percent): C, 65.9; H, 7.9; N, 5.2.

EXAMPLE IX

The compounds listed below are prepared according to the procedure of Example I from n-butyl lithium and the appropriate aminoalkyl halide (Cl-Y wherein Y is as difined above), 4-(alkyl substituted) bromo benzene or 2-(alkyl substituted)thiophene and styrene oxide reactants.

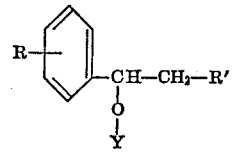

| R | R' | Y | Salt |
|---|----|---|------|
| H | 4-(n-$C_3H_7$)$C_6H_4$ | —$CH_2CH_2N(CH_3)_2$ | Hydrochloride. |
| H | 4-(i-$C_3H_7$)$C_6H_4$ | —$CH_2CH_2N(n-C_4H_9)_2$ | Citrate. |
| H | 4-(n-$C_4H_9$)$C_6H_4$ | —$CH_2CH_2CH_2N(C_2H_5)_2$ | Oxalate. |
| H | 4-(i-$C_4H_9$)$C_6H_4$ | —$(CH_2)_4$-N$(CH_3)_2$ | Maleate. |
| H | 4-(t-$C_4H_9$)$C_6H_4$ | —$CH_2CH_2N$-(i-$C_3H_7$)$_2$ | Citrate. |
| H | 4-(n-$C_5H_{11}$)$C_6H_4$ | —$(CH_2)_4$-N$(C_2H_5)_2$ | Tartrate. |
| H | 4-(i-$C_5H_{11}$)$C_6H_4$ | —$CH_2CH_2N(n-C_3H_7)_2$ | Hydrobromide. |
| H | 4-(neo-$C_5H_{11}$)$C_6H_4$ | —$CH_2CH_2$-pyrrolidino | |
| H | 4-(neo-$C_5H_{11}$)$C_6H_4$ | —$(CH_2)_4$-piperidino | |
| H | 4-(i-$C_3H_7$)$C_6H_4$ | —$CH_2CH_2$-morpholino | Oxalate. |
| H | 4-(neo-$C_5H_{11}$)$C_6H_4$ | —$CH_2CH_2$-(4-methylpiperazino) | Lactate. |
| H | 4-(sec-$C_4H_9$)$C_6H_4$ | —$CH_2CH_2$-(4-benzylpiperazino) | Gluconate. |
| H | 4-(i-$C_3H_7$)$C_6H_4$ | —$(CH_2)_3$-(4-isopropylpiperazino) | p-Toluenesulphonate. |
| H | 4-(neo-$C_5H_{11}$)$C_6H_4$ | $CH_2CH_2$-perhydroazepino | Citrate. |
| H | 4-(t-$C_4H_9$)$C_6H_4$ | $(CH_2)_3$-(4-methylperhydro-1,4-diazepino) | Fumarate. |
| 3-Cl | 4-(neo-$C_5H_{11}$)$C_6H_4$ | —$CH_2CH_2(N$-benzyl)piperazino | Sulphate. |
| 4-Cl | 4-(neo-$C_5H_{11}$)$C_6H_4$ | —$(CH_2)_3$—N$(CH_3)_2$ | Phosphate. |
| 4-Br | 4-(t-$C_4H_9$)$C_6H_4$ | —$(CH_2)_4$—N—$(CH_3)_2$ | Oxalate. |
| 3-Br | 4-(i-$C_3H_7$)$C_6H_4$ | —$CH_2CH_2$(4-ethylpiperazino) | Citrate. |
| 3-F | 4-(t-$C_5H_{11}$)$C_6H_4$ | —$CH_2CH_2$-(4-n-butylpiperazino) | Fumarate. |
| 4-F | 4-(n-$C_3H_7$)$C_6H_4$ | —$(CH_2)_4$-morpholino | Lactate. |
| 3-I | 4-(neo-$C_5H_{11}$)$C_6H_4$ | —$CH_2CH_2$-thiomorpholino | Sulphosalicylate. |
| 4-I | 4-(t-$C_4H_9$)$C_6H_4$ | —$CH_2CH_2$—N(n-$C_4H_9$)$_2$ | Acetate. |
| H | 5-(t-$C_4H_9$)-2-thienyl | —$CH_2CH_2N(n-C_3H_7)_2$ | Oxalate. |
| H | 5-(i-$C_3H_7$)-2-thienyl | —$(CH_2)_3$—N$(C_2H_5)_2$ | Hydrobromide. |
| H | 5-(n-$C_4H_9$)-2-thienyl | —$(CH_2)_4$—N$(CH_3)_2$ | Saccharaet. |
| H | 5-(t-$C_4H_9$)-2-thienyl | —$CH_2CH_2$-piperidino | Maleate. |
| H | 5-(neo-$C_5H_{11}$)-2-thienyl | —$CH_2CH_2$-thiomorpholino | Succinate. |
| H | do | —$(CH_2)_4$-morpholino | Butyrate. |
| H | 5-(sec-$C_4H_9$)-2-thienyl | —$CH_2CH_2$-pirperazino | Benzoate. |
| H | 5-(n-$C_3H_7$)-2-thienyl | —$CH_2CH_2$-(4-benzyl piperazino) | Citrate. |
| H | 5-(i-$C_5H_{11}$)-2-thienyl | —$(CH_2)_3$-(4-methyl piperazino) | Do. |
| H | 5-(n-$C_5H_{11}$)-2-thienyl | —$CH_2CH_2$-(4-n-butyl piperazino) | Tartrate. |
| 3-Cl | 5-(neo-$C_5H_{11}$)-2-thienyl | —$CH_2CH_2N$-(n-$C_3H_7$)$_2$ | Oxalate. |
| 3-Cl | 5-(t-$C_4H_9$)-2-thienyl | —$CH_2CH_2N$(i-$C_3H_7$)$_2$ | Gluconate. |
| 3-Cl | 5-(neo-$C_5H_{11}$)-2-thienyl | —$CH_2CH_2$-pyrrolidino | Oxalate. |
| 4-Cl | 5-(i-$C_4H_9$)-2-thienyl | —$CH_2CH_2$-perhydroazepino | Fumarate. |
| 3-Br | 5-(sec-$C_4H_9$)-2-thienyl | —$CH_2CH_2$—N(n-$C_4H_9$)$_2$ | Hydroiodide. |
| 4-Br | 5-(n-$C_5H_{11}$)-2-thienyl | —$(CH_2)_3$-perhydroazepino | Dihydrochloride. |
| 4-I | 5-(t-$C_4H_9$)-2-thienyl | —$CH_2CH_2$-(4-methyl perhydro-1,4-diazepino) | Do. |
| 3-I | 5-(i-$C_3H_7$)-2-thienyl | —$(CH_2)_3$-morpholino | Citrate. |
| 3-F | 5-(neo-$C_5H_{11}$)-2-thienyl | —$CH_2CH_2$-(4-benzylperhydro-1,4-diazepino) | Dihydrochloride. |
| 4-F | do | —$(CH_2)_3$-(4-benzylpiperazino) | Do. |

PREPARATION A

Halo-substituted styrene oxides

The appropriate halo-substituted styrene (0.145 mole) is added to a solution of perbenzoic acid (0.15 mole) in chloroform (250 ml.) at 0° C. The reaction mixture is held at 0° C. for twenty-four hours and is shaken frequently during the first hour of the reaction.

The reaction mixture is then extracted with an excess of 10% sodium hydroxide solution, and then washed with water to remove the sodium hydroxide. The chloroform solution is dried ($Na_2SO_4$) and fractionated to produce the halo-substituted styrene oxide.

In this manner, the following compounds are prepared:

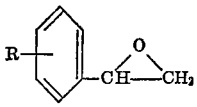

R:
- 3-Br
- 4-Br
- 3-F
- 4-F
- 3-I
- 4-I

What is claimed is:

1. A compound having the formula

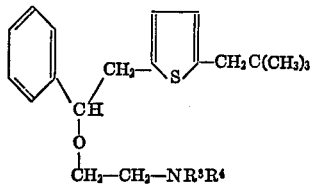

wherein $R^3$ and $R^4$ when taken together with the nitrogen atom to which they are attached form a saturated heterocyclic group containing from 5 to 7 atoms in the heterocyclic ring selected from the group consisting of pyrrolidino, piperidino, piperazino, N-(lower alkyl)piperazino, N-benzylpiperazino, morpholino, thiomorpholino and perhydroazepino.

2. A compound having the formula

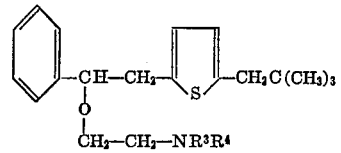

wherein each of $R^3$ and $R^4$ is lower alkyl.

3. A compound according to claim 2 wherein each of $R^3$ and $R^4$ is n-propyl.

4. A compound according to claim 1 wherein $R^3$ and $R^4$ together with the nitrogen atom to which they are attached form a perhydroazepino group.

References Cited

UNITED STATES PATENTS

| | | | |
|---|---|---|---|
| 2,454,092 | 11/1948 | Rieveschl | 260—243 |
| 3,102,072 | 8/1963 | Arnold et al. | 167—52 |
| 2,532,292 | 12/1950 | Cusic | 260—570 |

JOHN D. RANDOLPH, Primary Examiner

G. T. TODD, Assistant Examiner

U.S. Cl. X.R.

260—243 B, 247.1, 268 H, 268 BZ, 293.68, 293.83, 326.5 R, 326.55 M, 332.3 R, 570.6, 999